(12) United States Patent
Dai et al.

(10) Patent No.: US 12,028,139 B2
(45) Date of Patent: Jul. 2, 2024

(54) WIRELESS TELECOMMUNICATIONS NETWORK INCLUDING A MULTI-LAYER TRANSMISSIVE RECONFIGURABLE INTELLIGENT SURFACE

(71) Applicant: BRITISH TELECOMMUNICATIONS PUBLIC LIMITED COMPANY, London (GB)

(72) Inventors: Linglong Dai, London (GB); Kunzan Liu, London (GB); Zijian Zhang, London (GB); Richard MacKenzie, London (GB); Mo Hao, London (GB)

(73) Assignee: British Telecommunications Public Limited Company (GB)

( * ) Notice: Subject to any disclaimer, the term of this patent is extended or adjusted under 35 U.S.C. 154(b) by 0 days.

(21) Appl. No.: 18/277,668

(22) PCT Filed: Jan. 26, 2022

(86) PCT No.: PCT/EP2022/051724
§ 371 (c)(1),
(2) Date: Aug. 17, 2023

(87) PCT Pub. No.: WO2022/175035
PCT Pub. Date: Aug. 25, 2022

(65) Prior Publication Data
US 2024/0039592 A1    Feb. 1, 2024

(51) Int. Cl.
*H04B 7/06* (2006.01)
*H04B 7/04* (2017.01)
(52) U.S. Cl.
CPC ....... *H04B 7/0617* (2013.01); *H04B 7/04013* (2023.05)

(58) Field of Classification Search
CPC .......................... H04B 7/0617; H04B 7/04013
See application file for complete search history.

(56) References Cited

U.S. PATENT DOCUMENTS

| | | | |
|---|---|---|---|
| 2008/0311963 A1* | 12/2008 | Strawn ................ | H04M 1/0235 455/575.1 |
| 2016/0037560 A1* | 2/2016 | Liu ........................ | H04B 7/088 370/329 |
| 2018/0287822 A1* | 10/2018 | Wang .................. | H04L 25/0202 |
| 2019/0044246 A1 | 2/2019 | Pitsillides et al. | |

(Continued)

FOREIGN PATENT DOCUMENTS

| | | |
|---|---|---|
| CN | 110266352 A | 9/2019 |
| CN | 110830097 A | 2/2020 |

(Continued)

OTHER PUBLICATIONS

"International Search Report and Written Opinion for Application No. PCT/CN2021/077059, dated Nov. 11, 2021".
"International Search Report and Written Opinion for Application No. PCT/EP2022/051724, dated May 31, 2022".
Guo, H, et al. , "Weighted Sum-Rate Maximization for Intelligent Reflecting Surface Enhanced Wireless Networks" , IEEE Global Communications Conference (GLOBECOM), 6 pages.

(Continued)

*Primary Examiner* — Raymond S Dean
(74) *Attorney, Agent, or Firm* — Pranger Law PC (57) ABSTRACT

This disclosure provides a method of controlling a transmission of a wireless signal in a wireless telecommunications network, the wireless telecommunications network including a transmitter, a multi-layer transmissive Reconfigurable Intelligent Surface (RIS) including a first transmissive RIS layer and a last transmissive RIS layer, and a receiver.

19 Claims, 6 Drawing Sheets

(56) References Cited

U.S. PATENT DOCUMENTS

| | | | |
|---|---|---|---|
| 2019/0103665 A1 | 4/2019 | Yoo et al. | |
| 2020/0119875 A1 | 4/2020 | Wilson et al. | |
| 2021/0126359 A1* | 4/2021 | Kim | H04B 7/145 |
| 2021/0288698 A1* | 9/2021 | Chen | H04B 7/0617 |
| 2021/0302561 A1* | 9/2021 | Bayesteh | G01S 13/765 |
| 2022/0059943 A1* | 2/2022 | Saab | H04B 7/0617 |

FOREIGN PATENT DOCUMENTS

| | | |
|---|---|---|
| CN | 110839204 A | 2/2020 |
| CN | 111464223 A | 7/2020 |
| CN | 111698046 A | 9/2020 |
| CN | 110839204 B | 10/2020 |
| CN | 110266352 B | 5/2021 |
| CN | 110830097 B | 5/2021 |
| CN | 111464223 B | 4/2022 |
| WO | 2020043282 A1 | 3/2020 |

OTHER PUBLICATIONS

Liu, C, et al., "Programmable Artificial Intelligence Machine for Wave Sensing and Communications", Research Square, 42 pages.

Lu, R, "Joint Beamforming and Phase Optimization in a Multi-user Communication System Composed of Dual Reconfigurable Intelligent Surfaces", arXiv:2102.00767v1, 10 pages.

Lu, Y, et al., "Reconfigurable Intelligent Surface Based Hybrid Precoding for THz Communications", arXiv:2012.06261v1, 26 pages.

Zeng, S, et al., "Reconfigurable Intelligent Surfaces in 6G: Reflective, Transmissive, or Both?", arXiv:2102.06910v1, 5 pages.

Zhang, S, et al., "Intelligent Omni-Surface: Ubiquitous Wireless Transmission by Reflective-Transmissive Metasurface", arXiv:2011.00765v1, 30 pages.

Chinese Office Action for 202280015597.X dated Dec. 26, 2023, 7 pgs.

* cited by examiner

WIRELESS TELECOMMUNICATIONS NETWORK INCLUDING A MULTI-LAYER TRANSMISSIVE RECONFIGURABLE INTELLIGENT SURFACE

PRIORITY CLAIM

The present application is a National Phase entry of PCT Application No. PCT/EP2022/051724, filed Jan. 26, 2022, which claims priority from CN Patent Application No. PCT/CN2021/077059, filed Feb. 20, 2021, each of which is hereby fully incorporated herein by reference.

TECHNICAL FIELD

The present disclosure relates to a wireless telecommunications network having a reconfigurable intelligent surface.

BACKGROUND

In wireless telecommunications, a wireless signal being transmitted between a transmitter and receiver generally degrades due to interference from other wireless signals and/or other physical phenomena (e.g. fading and blockage). This has generally been addressed by improving the transmission characteristics (e.g. higher power transmissions or repeaters) or transmission processing techniques (e.g. more robust modulation schemes). An emerging concept in wireless telecommunications is the concept of a reconfigurable propagation environment, or "smart radio environment", which may improve the transmission quality. This may be achieved by use of a surface of electromagnetic material, often known as a Reconfigurable Intelligent Surface (RIS), which may be operated to apply a change to an incident wireless signal, such as a change in phase, amplitude, frequency and polarization, so as to improve the transmission quality between the transmitter and the receiver.

One use of the RIS is to assist in beamforming between the transmitter and receiver. A conventional method of beamforming in a wireless telecommunications network (that is, a wireless telecommunication network that does not include an RIS) is to use a phased array based hybrid precoder. However, the equipment costs and resource consumption (including energy resource and processing resource) are known to be high compared to wireless telecommunications networks that do not implement beamforming. It has been shown that an RIS may be configured to assist a transmitter to beamform, such as in the Institute of Electrical and Electronics Engineers (IEEE) article, "Reconfigurable Intelligent Surface Based Hybrid Precoding for THz Communications" by Yu Lu and Linglong Dai. As the RIS is nearly passive and easy to deploy, this system is a cost-effective and resource-efficient beamforming solution.

Alternative names for the RIS include large intelligent surface, large intelligent metasurface, programmable metasurface, reconfigurable metasurface, smart reflect-arrays, intelligent reflective surface, software-defined surface, and passive intelligent surface. The term "reconfigurable" is often used to indicate that the angle of reflection can be configured regardless of the angle of incidence. Although most RISs are implemented as reflective surfaces, an RIS may also be a transmissive surface in which the incident wireless signal is transmitted through the surface. However, these have generally not been considered as a feasible technology, especially for telecommunications, due to the propagation loss that is experienced as the wireless signal passes through the RIS.

SUMMARY

According to a first aspect of the disclosure, there is provided a method of controlling a transmission of a wireless signal in a wireless telecommunications network, the wireless telecommunications network including a transmitter, a multi-layer transmissive Reconfigurable Intelligent Surface, RIS, including a first transmissive RIS layer and a last transmissive RIS layer, and a receiver, the method comprising determining a beamforming vector to be applied by the transmitter, a first phase shift matrix to be applied by the first transmissive RIS layer, a last phase shift matrix to be applied by the last transmissive RIS layer, and a combining vector to be applied by the receiver; and, in a transmission of a wireless signal from the transmitter to the receiver, the wireless signal passing through the first transmissive RIS layer and the last transmissive RIS layer, causing the transmitter to use the determined beamforming vector, causing the first transmissive RIS layer to use the determined first phase shift matrix, causing the last transmissive RIS layer to use the determined last phase shift matrix, and causing the receiver to use the determined combining vector.

The beamforming vector, first phase shift matrix, second phase shift matrix and combining vector may be determined as a solution to a wireless communications performance optimization problem. The wireless communications performance optimization problem may be solved in a series of iterations until a convergence criterion is met. The convergence criterion may be based on a current wireless communication performance for a current iteration of the series of iterations, and the current wireless communications performance is determined based on: a beamforming vector for the current iteration of the series of iterations, based on the first phase shift matrix of a previous iteration of the series of iterations, the last phase shift matrix of the previous iteration of the series of iterations and the combining vector of the previous iteration of the series of iterations; a first phase shift matrix of the current iteration of the series of iterations, based on the beamforming vector of the previous iteration of the series of iterations, the last phase shift matrix of the previous iteration of the series of iterations and the combining vector of the previous iteration of the series of iterations; a last phase shift matrix of the current iteration of the series of iterations, based on the beamforming vector of the previous iteration of the series of iterations, the first phase shift matrix of the previous iteration of the series of iterations and the combining vector of the previous iteration of the series of iterations; and a combining vector of the current iteration of the series of iterations, based on the beamforming vector of the previous iteration of the series of iterations, the first phase shift matrix of the previous iteration of the series of iterations and the last phase shift matrix of the previous iteration of the series of iterations. The previous iteration may be the immediately preceding iteration.

The combining vector for the current iteration of the series of iterations may be determined as:

$$v = \psi_{max}\left(g^H\left(\prod_{r=R}^{1}\Theta_r f_r\right)ww^H\left(\prod_{r=R}^{1}\Theta_r f_r\right)^H g\right)$$

where:
   r is an element of a set of 1 to R, where R is a count of transmissive RIS layers of the multi-layer transmissive RIS,
   $\Psi_{max}$ is a matrix operator for calculating an eigenvector corresponding to a largest eigenvalue of $$\left(g^H\left(\prod_{r=R}^1 \Theta_r f_r\right)ww^H\left(\prod_{r=R}^1 \Theta_r f_r\right)^H g\right),$$

g is a frequency-domain channel matrix from the last transmissive RIS layer to the receiver,
   $\Theta_r$ is a phase shift matrix of an r-th transmissive RIS layer of the previous iteration of the series of iterations, including the first phase shift matrix of the first transmissive RIS layer of the previous iteration of the series of iterations when r equals 1 and the last phase shift matrix of the last transmissive RIS layer of the previous iteration of the series of iterations when r equals R,
   $f_r$ is a frequency-domain channel matrix from the transmitter to the first transmissive RIS layer when r equals 1 and is a frequency-domain channel matrix from an (r-1)-th transmissive RIS layer to an r-th transmissive RIS layer when r is greater than 1, and
   w is the beamforming vector of the previous iteration of the series of iterations.

The first phase shift matrix of the first transmissive RIS layer of the current iteration of the series of iterations may be determined as:

$$\theta_1 = \exp\left(j\arg\left(\text{diag}(f_1 w)^H \left(\prod_{r=R}^2 \Theta_r f_r\right)^H gv\right)\right)$$

where:
   r is an element of a set of 1 to R, where R is a count of transmissive RIS layers of the multi-layer transmissive RIS,
   $f_1$ is a frequency-domain channel matrix from the transmitter to the first transmissive RIS layer,
   w is the beamforming vector of the previous iteration of the series of iterations,
   $\Theta_r$ is a phase shift matrix of an r-th transmissive RIS layer of the previous iteration of the series of iterations, including the last phase shift matrix of the last transmissive RIS layer of the previous iteration of the series of iterations when r equals R,
   $f_r$ is a frequency-domain channel matrix from the (r-1)-th transmissive RIS layer to the r-th transmissive RIS layer,
   g is a frequency-domain channel matrix from the last transmissive RIS layer to the receiver, and
   v is the combining vector for the previous iteration of the series of iterations.

The last phase shift matrix of the last transmissive RIS layer of the current iteration of the series of iterations may be determined as:

$$\theta_R = \exp\left(j\arg\left(\text{diag}\left(f_R\left(\prod_{r=R-1}^1 \Theta_r f_r\right)w\right)^H gv\right)\right)$$

Where:
   r is an element of a set of 1 to R, where R is a count of transmissive RIS layers of the multi-layer transmissive RIS,
   $\Theta_r$ is a phase shift matrix of an r-th transmissive RIS layer of the previous iteration of the series of iterations, including the first phase shift matrix of the first transmissive RIS layer of the previous iteration of the series of iterations when r equals 1,
   $f_r$ is a frequency-domain channel matrix from the transmitter to the first transmissive RIS layer when r equals 1 and is a frequency-domain channel matrix from an (r-1)-th transmissive RIS layer to an r-th transmissive RIS layer when r is greater than 1,
   w is the beamforming vector of the previous iteration of the series of iterations,
   g is a frequency-domain channel matrix from the last transmissive RIS layer to the receiver, and
   v is the combining vector for the previous iteration of the series of iterations.

The beamforming vector of the current iteration of the series of iterations may be determined as:

$$w = \sqrt{P_{max}}\frac{\left(\prod_{r=R}^1 \Theta_r f_r\right)^H gv}{\left\|\left(\prod_{r=R}^1 \Theta_r f_r\right)^H gv\right\|_2}$$

where:
   r is an element of a set of 1 to R, where R is a count of transmissive RIS layers of the multi-layer transmissive RIS,
   $\Theta_r$ is a phase shift matrix of an r-th transmissive RIS layer of the previous iteration of the series of iterations, including the first phase shift matrix of the first transmissive RIS layer of the previous iteration of the series of iterations when r equals 1 and the last phase shift matrix of the last transmissive RIS layer of the previous iteration of the series of iterations when r equals R,
   $f_r$ is a frequency-domain channel matrix from the transmitter to the first transmissive RIS layer when r equals 1 and is a frequency-domain channel matrix from an (r-1)-th transmissive RIS layer to an r-th transmissive RIS layer when r is greater than 1,
   g is a frequency-domain channel matrix from the last transmissive RIS layer to the receiver, and
   v is the combining vector for the previous iteration of the series of iterations.

The multi-layer transmissive RIS may include one or more intermediate transmissive RIS layers and the transmission of the wireless signal from the transmitter to the receiver passes through the first transmissive RIS layer, each intermediate transmissive RIS layer and the last transmissive RIS layer, and the method further comprises determining an intermediate phase shift matrix for each of the one or more intermediate transmissive RIS layers to be applied by each respective intermediate transmissive RIS layer; and causing the first intermediate transmissive RIS layer to use the determined first intermediate phase shift matrix in the transmission of the wireless signal from the transmitter to the receiver, wherein the current wireless communications performance is determined based on: the beamforming vector for the current iteration of the series of iterations, that is further based on each intermediate phase shift matrix of the previous iteration of the series of iterations, the first phase shift matrix of the current iteration of the series of iterations, that is further based on each intermediate phase shift matrix of the previous iteration of the series of iterations, each intermediate phase shift matrix for the current iteration of the series of iterations, each intermediate phase shift matrix being based on the beamforming vector of the previous iteration of the series of iterations, the first phase shift matrix of the previous iteration of the series of iterations, the last phase shift matrix of the previous iteration of the series of iterations, the combining vector of the previous iteration of the series of iterations and, if there is more than one intermediate transmissive RIS layer, each other intermediate phase shift matrix of the previous iteration of the series of iterations, the last phase shift matrix of the current iteration of the series of iterations, that is further based on each intermediate phase shift matrix of the previous iteration of the series of iterations, and the combining vector of the current iteration of the series of iterations, that is further based on each intermediate phase shift matrix of the previous iteration of the series of iterations.

Each intermediate phase shift matrix for the current iteration of the series of iterations may be determined as:

$$\theta_l = \exp\left(j\arg\left(\mathrm{diag}\left(f_l\left(\prod_{r=l-1}^{1}\Theta_r f_r\right)w\right)^H\left(\prod_{r=R}^{l+1}\Theta_r f_r\right)^H gv\right)\right)$$

where:
r is an element of a set of 1 to R, where R is a count of transmissive RIS layers in the multi-layer transmissive RIS,
l is an element of a set of 2 to R-1,
$f_l$ is a frequency-domain channel matrix from the (l-1)-th transmissive RIS layer to the l-th transmissive RIS layer,
$\Theta_r$ is a phase shift matrix of an r-th transmissive RIS layer of the previous iteration of the series of iterations, including the first phase shift matrix of the first transmissive RIS layer of the previous iteration of the series of iterations when r equals 1 and the last phase shift matrix of the last transmissive RIS layer of the previous iteration of the series of iterations when r equals R,
$f_r$ eis a frequency-domain channel matrix from the transmitter to the first transmissive RIS layer when r equals 1 and is a frequency-domain channel matrix from an (r-1)-th transmissive RIS layer to an r-th transmissive RIS layer when r is greater than 1,
w is the beamforming vector of the previous iteration of the series of iterations,
g is a frequency-domain channel matrix from the last transmissive RIS layer to the receiver, and
v is the combining vector for the previous iteration of the series of iterations.

The wireless communications performance problem may be a Signal to Noise Ratio, SNR, optimization problem.

According to a second aspect of the disclosure, there is provided a computer program comprising instructions which, when the program is executed by a computer, cause the computer to carry out the first aspect of the disclosure. The computer program may be stored on a computer readable carrier medium.

According to a third aspect of the disclosure, there is provided a device for controlling a transmission of a wireless signal in a wireless telecommunications network, the wireless telecommunications network including a receiver configured to apply a combining vector to the wireless signal, the device comprising: a transmitter; and a multi-layer transmissive Reconfigurable Intelligent Surface, RIS, including a first transmissive RIS layer and a last transmissive RIS layer, wherein the transmitter is configured to transmit the wireless signal to the receiver, the wireless signal passing through the first transmissive RIS layer and the last transmissive RIS layer, the transmitter is configured to apply a beamforming vector to the wireless signal, the first transmissive RIS is configured to apply a first phase shift matrix to the wireless signal, and the last transmissive RIS is configured to apply a last phase shift matrix to the wireless signal.

The transmitter and multi-layer RIS may be enclosed in a housing having electromagnetic shielding.

The device may further comprise one or more processing modules configured to carry out the first aspect of the disclosure.

According to a fourth aspect of the disclosure, there is provided a system in a wireless telecommunications network comprising a device according to the third aspect of the disclosure, the system further comprising the receiver.

The system may further comprise one or more processing modules configured to carry out the first aspect of the disclosure. The one or more processing modules may be disposed on one or more of a group comprising: the device, the receiver, and an external node.

BRIEF DESCRIPTION OF THE DRAWINGS

In order that the present disclosure may be better understood, embodiments thereof will now be described, by way of example only, with reference to the accompanying drawings in which.

DETAILED DESCRIPTION OF EMBODIMENTS

Figure 1:
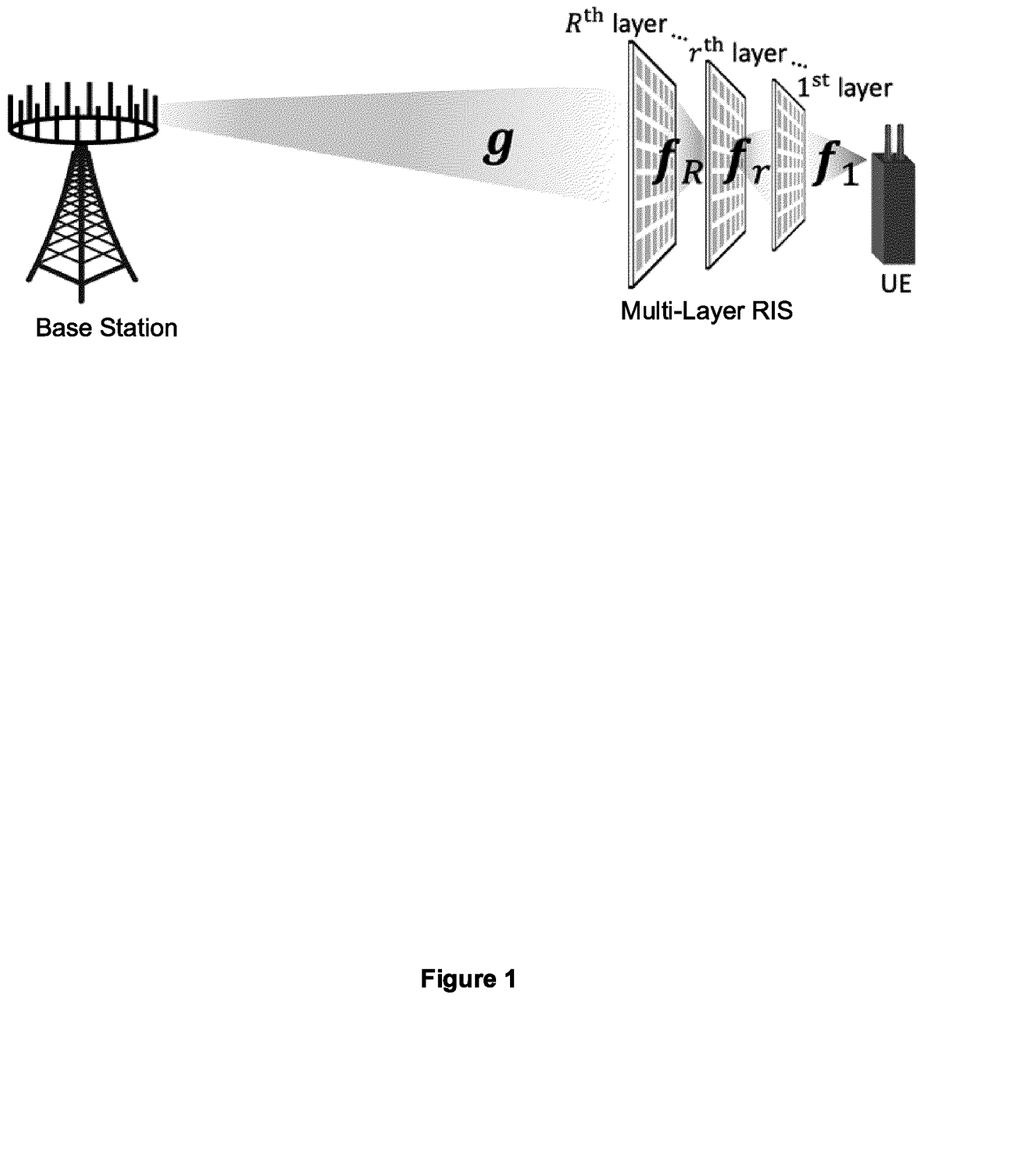
FIG. 1 is a schematic diagram of an embodiment of the present disclosure, illustrating a model of wireless communications performance for a multi-layer transmissive Reconfigurable Intelligent Surface (RIS).

Embodiments of the present disclosure provide a system and method for beamforming in a wireless telecommunications network having a Reconfigurable Intelligent Surface (RIS). An overview of the system and a model of its wireless communication performance will be described with reference to FIG. 1. FIG. 1 illustrates a UE, a multi-layer transmissive RIS having R transmissive layers, and a base station. Each transmissive layer of the multi-layer transmissive RIS, indexed by r, has $N_r$ elements, and we assume that each transmissive layer has the same number of elements for simplicity (such that $N_r$ is equal to N for all values of r). The base station has M antennas and the UE has K antennas.

Let $f_1 \in \mathbb{C}^{N \times K}$ denote the frequency-domain channel matrix from the UE to the first layer of the multi-layer RIS, $f_r \in \mathbb{C}^{N \times N}$ denote the frequency-domain channel matrix from the (r−1)-th layer of the multi-layer transmissive RIS to r-th layer of the multi-layer transmissive RIS for all r∈{2, 3, ..., R}, and g∈$C^{N \times M}$ denote the frequency-domain channel matrix from the R-th layer of the multi-layer transmissive RIS to the base station. Denote $\Theta_r$=diag($\Theta_r$)=diag ($\Theta_{r,1}$, ... $\Theta_{r,N}$) for all r E {1, 2, ..., R} as the phase shift matrix at the multi-layer transmissive RIS's r-th layer, where |$\Theta_{r,n}$|=1 for all n E {1, 2, ..., N}. The signal vector received at the BS can be represented as:

$$y = g^H \left( \prod_{r=R}^{1} \Theta_r f_r \right) ws + n, \quad (1\text{-}1)$$

where w is the beamforming vector with power constraint $\|w\|_2^2 \leq P_{max}$ and s is the transmitted symbol. Additive White Gaussian Noise (AWGN) introduced in the base station's decoding satisfies n~CN(0, $\sigma^2 I_M$) where $\sigma^2$ is the noise power and $I_M$ is an identity matrix of size M. The communication performance of the device may be evaluated by the decoding Signal to Noise Ratio (SNR) as:

$$SNR = \frac{|v^H g^H (\prod_{r=R}^{1} \Theta_r f_r) w|^2}{\| v^H \|_2^2 \sigma^2}, \quad (1\text{-}2)$$

where v denotes the combining vector at the base station and $gH(\Pi_{r=R}^{1}\Theta_r f_r)$ denotes the equivalent channel between the UE and the base station. In this context, the "equivalent" channel is the overall channel matrix applied to the transmitted signal as it arrives at the base station, based on all channel matrices experienced by the transmitted signal. Assuming that the Channel State Information (CSI) is perfectly known, the beamforming vector w at the UE, the combining vector v at the base station, and the phase shift matrix $\Theta_1$, ..., $\Theta_R$ of the multi-layer transmissive RIS should be jointly optimized to maximize SNR.

Based on this model, an SNR optimization problem may be formulated as:

$$\max_{v,\Theta_r,w} SNR = \frac{|v^H g^H (\prod_{r=R}^{1} \Theta_r f_r) w|^2}{\| v^H \|_2^2 \sigma^2} \quad (1\text{-}3)$$

$$s.t. \|w\|_2^2 \leq P_{max}$$

$$|\Theta_{r,n}|=1, \forall r,n$$

A first embodiment of a method of the present disclosure, discussed below, describes an iterative algorithm for obtaining the optimal solution of all variables to this SNR optimization problem. Before discussing this method, an embodiment of a cellular telecommunications network of the present disclosure will be described with reference to FIG. 2.

Figure 2:
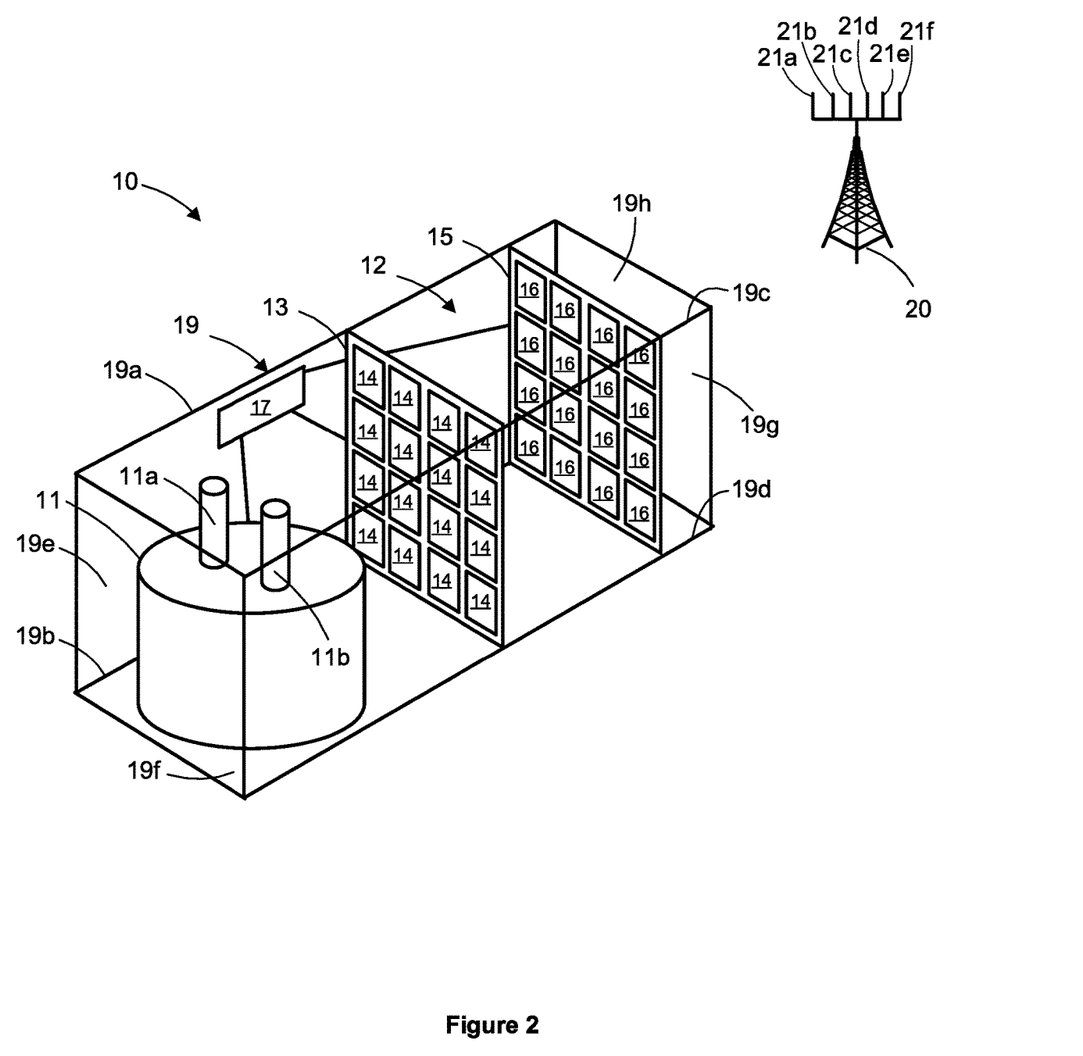
FIG. 2 is a schematic diagram of a first embodiment of a cellular telecommunications network having a two-layer transmissive MS.

The cellular telecommunications network includes a device 10 and a base station 20. The device 10 includes a User Equipment (UE) 11 and a multi-layer RIS 12, all enclosed within a housing 19, and further includes a processor 17. In this embodiment, the UE 11 and each layer of the multi-layer RIS 12 are connected to the processor 17 via a wired communications link. The multi-layer RIS 12 includes a first transmissive RIS 13 (being a first layer of the multi-layer RIS 12) and a second transmissive RIS 15 (being a second layer of the multi-layer RIS 12). In this embodiment, the UE 11 and first transmissive RIS 13 are separated by a distance of around 0.05 m, the first transmissive RIS 13 and second transmissive RIS 15 are separated by a distance of around 0.05 m, and the second transmissive RIS 15 and base station 20 are separated by a distance of around 20 m.

The housing 19 includes a first, second, third and fourth elongate supporting member 19a, 19b, 19c, 19d and a first, second, third and fourth wall 19e, 19f, 19g, 19h, such that the housing 19 has an open-ended rectangular cuboidal shape (the open-ends being the faces of the rectangular cuboidal shape that are not defined by the walls 19e, 19f, 19g, 19h). The first, second, third and fourth walls 19e, 19f, 19g, 19h are constructed of a radio-frequency absorbing material. This radio-frequency absorbing material should be chosen to protect the stability of the internal channels (that is, $f_1$ to $f_R$) such as by absorbing any radio-frequencies from external sources that would otherwise cause interference. Furthermore, this absorbing material should avoid undesired diffraction or reflection.

The UE 11 includes a first and second transceiver $11_a$, $11_b$ arranged as a Uniform Linear Array (ULA). The base station 20 includes a first, second, third, fourth, fifth and sixth transceiver 21a, 21b, 21c, 21d, 21e, 21f, also arranged as a ULA. The UE 11 and base station 20 may communicate with each other using a cellular telecommunications protocol, such as the 5th Generation (5G) protocol defined by the 3rd Generation Partnership Project (3GPP). An uplink wireless signal from the UE 11 to the base station 20 may be transmitted through the first transmissive RIS 13, then through the second transmissive RIS 15, and then to the base station 20.

The first transmissive RIS 13 includes a plurality of elements 14, each of which may be controlled by processor 17 to apply a particular phase shift to a wireless signal passing through that element 14. Similarly, the second transmissive RIS 15 includes a plurality of elements 16, each of which may be controlled by processor 17 to apply a particular phase shift to the wireless signal passing through that element 16. In this embodiment, a count of elements in the plurality of elements 14 for the first transmissive RIS 13 is equal to a count of elements in the plurality of elements 16 for the second transmissive RIS 15. FIG. 2 illustrates the first transmissive RIS 13 and second transmissive RIS 15 both having a square form, but the skilled person will understand that this is non-essential.

Figure 3:
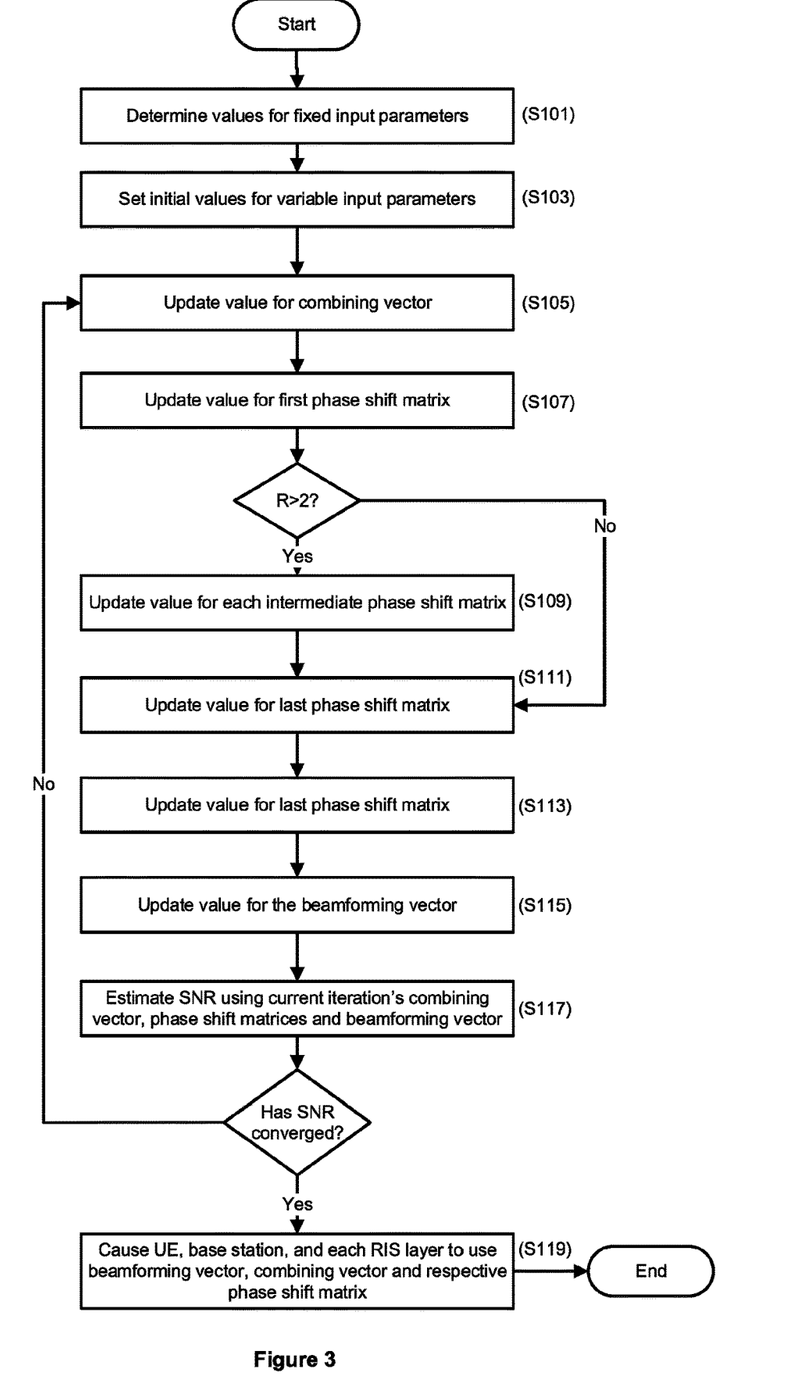
FIG. 3 is a flow diagram of a first embodiment of a method of the present disclosure.

The first embodiment of the method of the present disclosure will now be described with reference to the flow diagram of FIG. 3. As noted above, this embodiment provides an iterative algorithm to obtain an optimal solution of all variables of the SNR optimization problem. This is achieved by decoupling the coupled variables —the beamforming vector w, the combining vector v, and the phase shift matrices $\Theta_r$—and alternately optimizing each variable with the other variables fixed. The algorithm will be described for a multi-layer RIS having R layers (including a first layer, a last layer, and optionally one or more intermediate layers between the first and last layers), which can be applied to the two-layer RIS of the first embodiment of the cellular network described above.

In S101, the processor 17 determines values for a plurality of input parameters, including channel matrices $f_1 \ldots f_R$ and g and the maximum transmit power $P_{max}$, that may be considered as fixed input parameters throughout a single performance of this embodiment. As the space between the UE 11 and the first layer of the multi-layer RIS (that is, the first transmissive RIS 13 in the first embodiment above) and the space between each layer of the multi-layer RIS are fixed and substantially shielded from electromagnetic fields (other than those produced by the UE 11) by the device's housing

19, then channel matrices $f_1 \ldots f_R$ are considered near-field static channels that are therefore unchanging following installation. Accordingly, $f_1 \ldots f_R$ may be measured and recorded during installation of the device 10. The channel matrix g is a far-field channel which may change with time and/or location. This may be measured by conventional channel estimation and channel feedback mechanisms. The value for the maximum transmit power $P_{max}$ is, in this embodiment, stored in the UE 11 and may be retrieved by the processor 17.

In S103, the processor 17 sets initial values for a plurality of variable input parameters. In this embodiment, the processor 17 sets w and v at 1 and generates initial values for $\Theta_1 \ldots \Theta_R$ randomly. The processor 17 then enters an iterative loop. In S105, the processor 17 updates its value for the combining vector v based on equation 1-5 below and its current values for all other variable parameters (being the initial values determined in S103 on the first iteration, or the values determined in the previous iteration of the iterative loop on subsequent iterations). For the combining vector, v, the SNR optimisation problem can be reformulated as:

$$\max_v SNR = \frac{v^H g^H \left(\prod_{r=R}^1 \Theta_r f_r\right) w w^H \left(\prod_{r=R}^1 \Theta_r f_r\right)^H g v}{\|v^H\|_2^2 \sigma^2} := \frac{v^H A v}{\|v^H\|_2^2 \sigma^2} \quad (1\text{-}4)$$

where $$A = g^H \left(\prod_{r=R}^1 \Theta_r f_r\right) w w^H \left(\prod_{r=R}^1 \Theta_r f_r\right)^H g$$

is a positive definite matrix. So the maximum of SNR is the largest eigenvalue of A, and the corresponding v is written as $$v = \psi_{max}\left(g^H \left(\prod_{r=R}^1 \Theta_r f_r\right) w w^H \left(\prod_{r=R}^1 \Theta_r f_r\right)^H g\right) \quad (1\text{-}5)$$

Where:
r is an element of a set of 1 to R, where R is a count of transmissive RIS layers in the multi-layer RIS,
$\psi_{max}(\bullet)$ is a matrix operator to calculate an eigenvector corresponding to a largest eigenvalue of matrix A,
g is a frequency-domain channel matrix from the last transmissive RIS layer to the base station,
$\Theta_r$ is a phase shift matrix of an r-th transmissive RIS layer (being the initial value determined in S103 on the first iteration, or the value determined in the previous iteration of the iterative loop on subsequent iterations),
$f_r$ is a frequency-domain channel matrix from the UE 11 to the first transmissive MS layer when r equals 1 and is a frequency-domain channel from an (r-1)-th transmissive RIS layer to an r-th transmissive RIS layer when r is greater than 1, and
w is the beamforming vector (being the initial value determined in S103 on the first iteration, or the value determined in the previous iteration of the iterative loop on subsequent iterations).

In S107, the processor 17 updates its value for $\Theta_1$, the phase shift matrix for the first transmissive-RIS layer of the multi-layer RIS, based on equation 1-7 below and its current values for all other variable parameters (being the initial values determined in S103 on the first iteration, or the values determined in the previous iteration of the iterative loop on subsequent iterations). For $\Theta_1$, the SNR optimisation problem can be reformulated as:

$$SNR = \frac{|v^H g^H \left(\prod_{r=R}^1 \Theta_r f_r\right) w|^2}{\|v^H\|_2^2 \sigma^2} = \frac{|v^H g^H \left(\prod_{r=R}^2 \Theta_r f_r\right) \mathrm{diag}\,(f_1 w) \theta_1|^2}{\|v^H\|_2^2 \sigma^2} \quad (1\text{-}6)$$

Because $\Theta_1$ is a vector whose components all have norm 1, the optimal value for $\Theta_1$ is $$\theta_1 = \exp\left(j \arg\left(\mathrm{diag}\,(f_1 w)^H \left(\prod_{r=R}^2 \Theta_r f_r\right)^H g v\right)\right) \quad (1\text{-}7)$$

Where:
r is an element of a set of 1 to R, where R is a count of transmissive RIS layers in the multi-layer RIS,
$f_1$ is a frequency-domain channel matrix from the UE 11 to the first transmissive RIS layer,
w is the beamforming vector (being the initial value determined in S103 on the first iteration, or the value determined in the previous iteration of the iterative loop on subsequent iterations),
$\Theta_r$ is a phase shift matrix of an r-th transmissive RIS layer (being the initial value determined in S103 on the first iteration, or the value determined in the previous iteration of the iterative loop on subsequent iterations),
$f_r$ is a frequency-domain channel matrix from the (r-1)-th transmissive RIS layer to the r-th transmissive RIS layer,
g is a frequency-domain channel matrix from the last transmissive RIS layer to the base station, and
v is the combining vector (being the initial value determined in S103 on the first iteration, or the value determined in the previous iteration of the iterative loop on subsequent iterations).

If the multi-layer RIS is comprised of two layers only, then the process skips to S111. If the multi-layer RIS is comprised of three or more layers, then, in S109, the processor 17 updates its value for $\theta_l$, where l=2, ..., R−1, being the phase shift matrix for each intermediate transmissive layer of the multi-layer RIS based on equation 1-9 below and its current values for all other variable parameters (being the initial values determined in S103 on the first iteration, or the values determined in the previous iteration of the iterative loop on subsequent iterations). For $\theta_l$, the SNR optimization problem can be reformulated as:

$$SNR = \frac{|v^H g^H \left(\prod_{r=R}^1 \Theta_r f_r\right) w|^2}{\|v^H\|_2^2 \sigma^2} = \quad (1\text{-}8)$$

$$\frac{|v^H g^H \left(\prod_{r=R}^{l+1} \Theta_r f_r\right) \mathrm{diag}\,\left(f_l \left(\prod_{r=l-1}^1 \Theta_r f_r\right) w\right) \theta_l|^2}{\|v^H\|_2^2 \sigma^2}$$

Because $\theta_l$ is a vector whose components all have norm 1, the optimal value for $\theta_l$ is $$\theta_l = \exp\left(j \arg\left(\mathrm{diag}\,\left(f_l \left(\prod_{r=l-1}^1 \Theta_r f_r\right) W\right)^H \left(\prod_{r=R}^{l+1} \Theta_r f_r\right)^H g v\right)\right) \quad (1\text{-}9)$$

Where:
- r is an element of a set of 1 to R, where R is a count of transmissive RIS layers in the multi-layer RIS,
- l is an element of a set of 2 to R-1, $f_l$ is a frequency-domain channel matrix from the (l-1)-th transmissive RIS layer to the l-th transmissive RIS layer,
- $\Theta r$ is a phase shift matrix of an r-th transmissive RIS layer (being the initial value determined in S103 on the first iteration, or the value determined in the previous iteration of the iterative loop on subsequent iterations),
- $f_r$ is a frequency-domain channel matrix from the UE 11 to the first transmissive RIS layer when r equals 1 and is a frequency-domain channel matrix from an (r-1)-th transmissive RIS layer to an r-th transmissive RIS layer when r is greater than 1,
- w is the beamforming vector (being the initial value determined in S103 on the first iteration, or the value determined in the previous iteration of the iterative loop on subsequent iterations),
- g is a frequency-domain channel matrix from the last transmissive RIS layer to the base station 20, and
- v is the combining vector (being the initial value determined in S103 on the first iteration, or the value determined in the previous iteration of the iterative loop on subsequent iterations).

In S111, the processor 17 updates its value for $\Theta_R$, the phase shift matrix for the last transmissive layer of the multi-layer RIS, based on equation 1-11 below and its current values for all other variable parameters (being the initial values determined in S103 on the first iteration, or the values determined in the previous iteration of the iterative loop on subsequent iterations). For $\Theta_R$, the SNR optimization problem can be reformulated as:

$$SNR = \frac{|v^H g^H (\prod_{r=R}^{1} \Theta_r f_r) w|^2}{\|v^H\|_2^2 \sigma^2} = \frac{|v^H g^H \mathrm{diag}(f_l(\prod_{r=R-1}^{1} \Theta_r f_r) w) \theta_R|^2}{\|v^H\|_2^2 \sigma^2} \quad (1\text{-}10)$$

Because $\theta_R$ is a vector whose components all have norm 1, the optimal value for $\theta_R$ is $$\theta_R = \exp\left(j\arg\left(\mathrm{diag}\left(f_R\left(\prod_{r=R-1}^{1} \Theta_r f_r\right) W\right)^H g v\right)\right) \quad (1\text{-}11)$$

Where:
- r is an element of a set of 1 to R, where R is a count of transmissive RIS layers of the multi-layer RIS,
- $\Theta_r$ is a phase shift matrix of an r-th RIS layer (being the initial value determined in S103 on the first iteration, or the value determined in the previous iteration of the iterative loop on subsequent iterations),
- $f_r$ is a frequency-domain channel matrix from the UE 11 to the first transmissive RIS layer when r equals 1 and is a frequency-domain channel matrix from an (r-1)-th transmissive RIS layer to an r-th transmissive RIS layer when r is greater than 1,
- w is the beamforming vector (being the initial value determined in S103 on the first iteration, or the value determined in the previous iteration of the iterative loop on subsequent iterations),
- g is a frequency-domain channel matrix from the last transmissive RIS layer to the base station 20, and
- v is the combining vector (being the initial value determined in S103 on the first iteration, or the value determined in the previous iteration of the iterative loop on subsequent iterations).

In S113, the processor 17 updates its value for the beamforming vector w based on equation 1-13 below and its current values for all other variable parameters (being the initial values determined in S103 on the first iteration, or the values determined in the previous iteration of the iterative loop on subsequent iterations). The optimal solution of normalized w, that is $$\frac{w}{\|w\|_2},$$

is:

$$\frac{w}{\|w\|_2} = \frac{\left(\prod_{r=R}^{1} \Theta_r f_r\right)^H g v}{\left\|\left(\prod_{r=R}^{1} \Theta_r f_r\right)^H g v\right\|_2}. \quad (1\text{-}12)$$

Considering the constraint $\|w\|_2^2 \leq P_{max}$, the optimal solution of w is $$w = \sqrt{P_{max}} \frac{\left(\prod_{r=R}^{1} \Theta_r f_r\right)^H g v}{\left\|\left(\prod_{r=R}^{1} \Theta_r f_r\right)^H g v\right\|_2} \quad (1\text{-}13)$$

Where:
- r is an element of a set of 1 to R, where R is a count of transmissive RIS layers of the multi-layer RIS,
- $\Theta_r$ is a phase shift matrix of an r-th transmissive RIS layer (being the initial value determined in S103 on the first iteration, or the value determined in the previous iteration of the iterative loop on subsequent iterations),
- $f_r$ is a frequency-domain channel matrix from the UE 11 to the first transmissive RIS layer when r equals 1 and is a frequency-domain channel matrix from an (r-1)-th transmissive RIS layer to an r-th transmissive RIS layer when r is greater than 1,
- g is a frequency-domain channel matrix from the last transmissive RIS layer to the base station 20, and
- v is the combining vector (being the initial value determined in S103 on the first iteration, or the value determined in the previous iteration of the iterative loop on subsequent iterations).

In S115, the processor 17 estimates the SNR of a transmission from the device 10 to the base station 20 using the values for w, v, and $\Theta_r$ determined in S105 to S113 above for the current iteration. This SNR estimate is stored in memory, together with an iteration identifier. In S117, the processor 17 evaluates the SNR estimates to determine whether a convergence condition has been satisfied. In this embodiment, the convergence condition is that the difference between the estimated SNR for the current iteration and the estimated SNR for the previous iteration is less than or equal to 1%. If the convergence condition has not been satisfied (such as when there has only been one iteration of the algorithm), then the process loops back to S105 for a further iteration. Once the convergence condition has been satisfied, then the processor 17 has determined final values of w, v, and $\Theta_r$ as those generated in the final iteration of the algorithm. The process then proceeds to S119 in which the processor 17 causes the UE 11 to use beamforming vector w in transmissions of wireless signals from the device 10 to the base station 20, causes each layer of the multi-layer RIS to use its respective phase shift matrix $\Theta_r$ (that is, causes the first transmissive RIS 13 to use $\Theta_1$ and causes the second transmissive RIS 15 to use $\Theta_2$) to apply phase shifts to the wireless signals passing through that layer, and causes the base station 20 to use the combining vector v to receive the wireless signals transmitted from the device 10 to the base station 20.

In this embodiment, the processor 17 implements a processor module for the UE and each layer of the multi-layer RIS, wherein the processing modules are configured to apply the beamforming vector to the UE's transmitted wireless signal or apply the respective phase shift matrix to the wireless signal as it passes through a layer of the multi-layer RIS. The base station 20 may also include a processing module for applying the combining vector to the received wireless signal. The processing modules for applying the phase shift matrices may be based on a Field Programmable Gate Array (FPGA) architecture in similar manner to that described in "Programmable artificial intelligence machine for wave sensing and communications", Che Lui et al.

Subsequently, the process may be triggered again (with new input values, particularly for g as the channel between the multi-layer RIS and the base station 20 changes over time) to determine new values for w, v, and $\Theta_r$. The trigger may be present in a signal from the base station or UE indicating that g has been updated.

In summary, the iterative algorithm may be defined as:

---
Iterative Algorithm
---
Inputs:
　　Channel matrix $f_1, \ldots, f_R$ and g;
　　Maximum transmit power $P_{max}$.
Outputs:
　　Maximum of SNR.
　　1: Initialize w, v, $\Theta_1, \ldots, \Theta_R$;
　　2: while no convergence of SNR do
　　3: 　Update v by (1 – 5);
　　4: 　Update $\Theta_1$ by (1 – 7);
　　5: 　if R>2, update $\Theta_2, \ldots, \Theta_{R-1}$ by (1 – 9);
　　6: 　Update $\Theta_R$ by (1 – 11);
　　7: 　Update w by (1 – 13);
　　8: end while
　　9: return SNR The performance of the above method, when applied to the cellular network of FIG. 2 having a two-layer RIS, can be evaluated by simulation, as shown in the FIGS. 4a, 4b, 4c and FIG. 5.

Figure 4A:
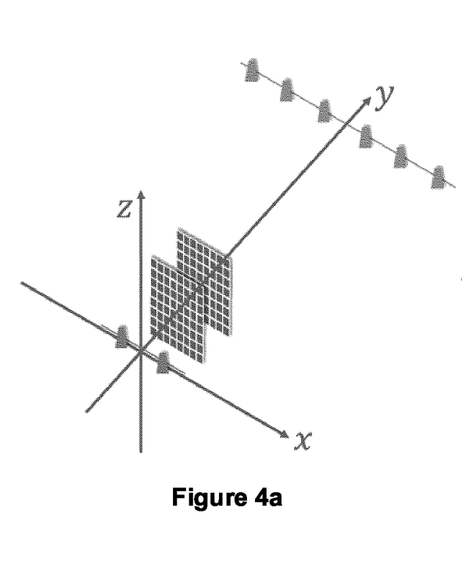
FIG. 4a is a schematic diagram of a simulation setup for the cellular telecommunications network of FIG. 2.

FIG. 4a illustrates a simulation of the cellular telecommunications network 1 of FIG. 2, in which the UE includes two antennas in a ULA, the multi-layer transmissive RIS includes two layers each having 64 elements, and the base station includes 6 antennas in a ULA. The UE and first layer of the multi-layer RIS are separated by 0.05 m, the first layer of the multi-layer RIS and the second layer of the multi-layer RIS are separated by and the second layer of the multi-layer RIS and the base station are separated by (such that the UE and base station are separated by 20.1 m). The UE transmits at a frequency of 1.5 GHz. The loss factor when a wireless signal passes through each layer of the multi-layer RIS is 0.8.

Figure 4B:
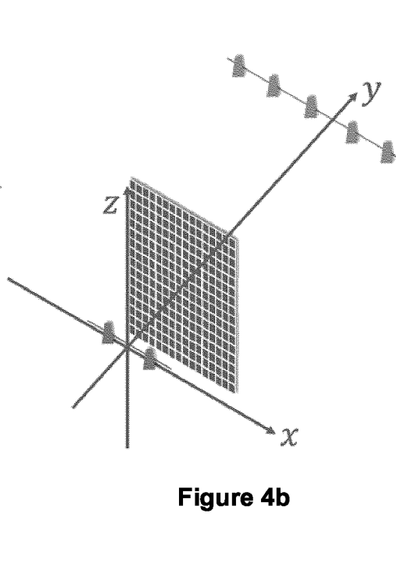
FIG. 4b is a schematic diagram of a simulation setup for an alternative network having a single-layer RIS.

FIG. 4b illustrates a simulation of an alternative cellular telecommunications network, for the purposes of comparison, in which the UE includes two antennas in a ULA, the RIS is a single-layer RIS having 256 elements, and the base station includes 6 antennas in a ULA. The UE and single-layer RIS are separated by 0.05 m, and the single-layer RIS and base station are separated by 20.05 m (such that the UE and base station are again separated by 20.1 m). The UE transmits at a frequency of 1.5 GHz. This simulation may be used for both a single-layer transmissive RIS (in which the loss factor when the wireless signal passes through the single-layer transmissive RIS is 0.8) or a single-layer reflective RIS, as the channel models are the same.

Figure 4C:
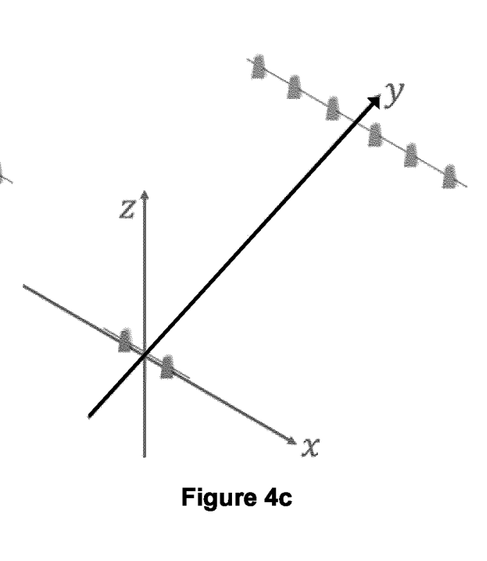
FIG. 4c is a schematic diagram of a simulation setup for an alternative network without a MS.

FIG. 4c illustrates a simulation of another alternative cellular telecommunications network, for the purposes of comparison, in which the UE includes two antennas in a ULA and the base station includes 6 antennas in a ULA. There is no RIS in this alternative network. The UE and base station are again separated by 20.1 m.

Figure 5:
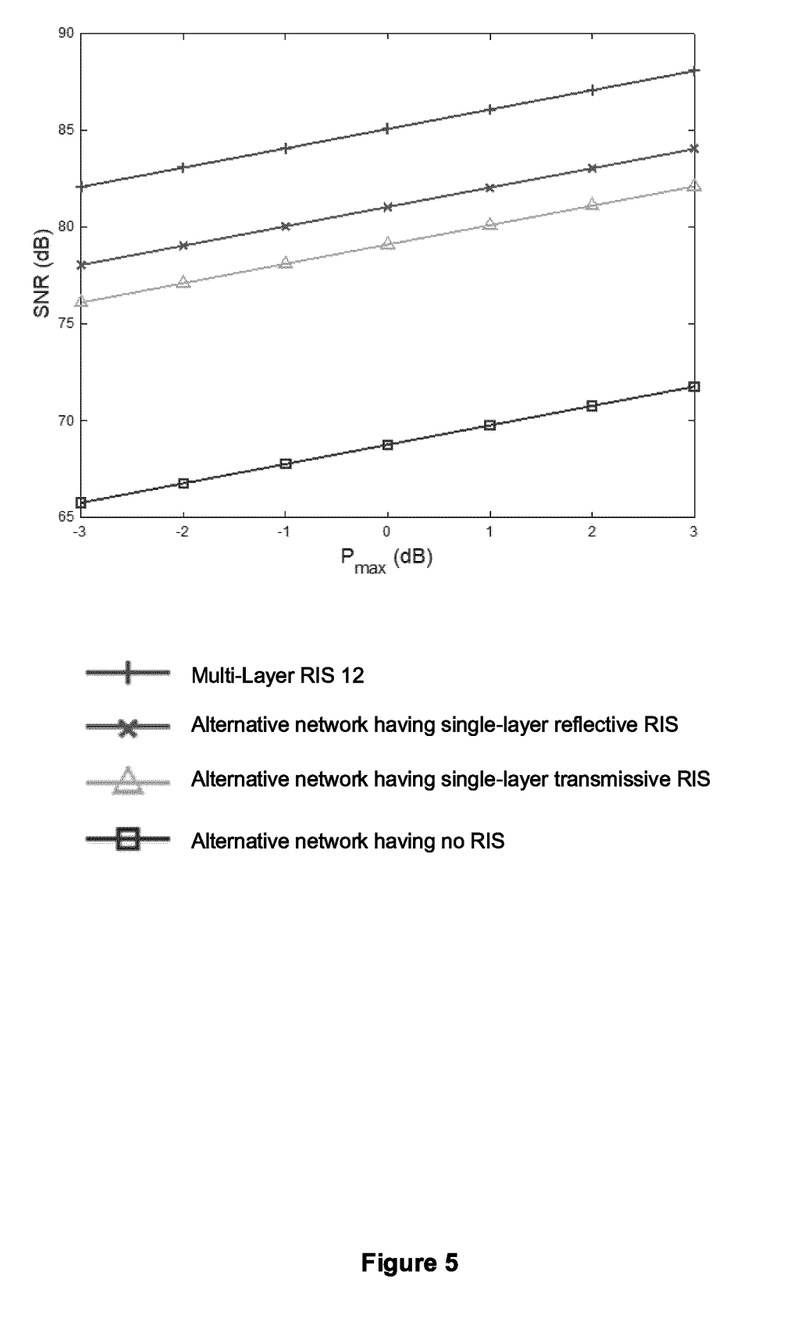
FIG. 5 is a graph illustrating transmission power against SNR.

FIG. 5 is a graph illustrating the decoding SNR against the power constraint, $P_{max}$ for the four scenarios covered by these simulations, 1) the alternative network having no RIS, 2) the alternative network having a single-layer transmissive RIS, 3) the alternative network having a single-layer reflective RIS, and 4) the first embodiment of the network of the present disclosure having a two-layer transmissive RIS. It can be seen that the cellular network of the embodiment of the present disclosure has the best wireless communication performance with a SNR improvement of around 4 dB above the next best performing scenario (the alternative network having a single-layer reflective RIS). The alternative network having a single-layer transmissive RIS scenario had an SNR around 2 dB lower than the alternative network having a single-layer reflective RIS, and the alternative network having no RIS was the worst performing scenario. These simulation results illustrate the improvement in wireless communication performance provided by the above embodiments of the disclosure relative to traditional RIS-based networks. Furthermore, these simulations are based on a two-layer RIS having half the number of elements compared to the single-layer reflective RIS and single-layer transmissive RIS, illustrating the cost-efficiency and power-efficiency benefits of the present disclosure (as the material costs and power requirements of a RIS are proportional to the number of elements).

Figure 6A:
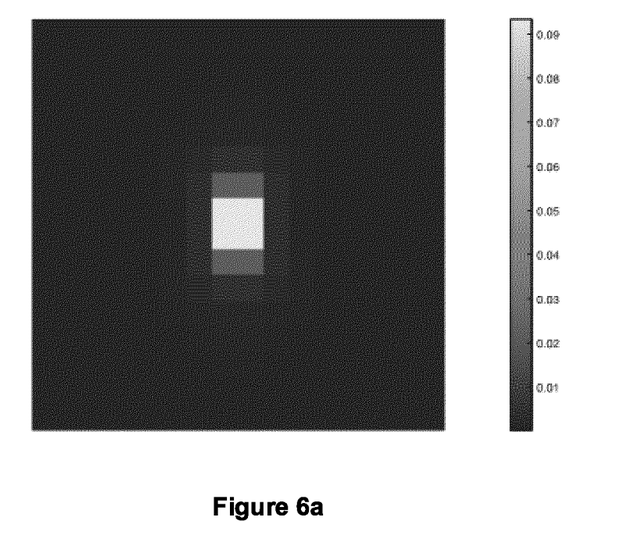
FIG. 6a is a power distribution chart for a single-layer transmissive RIS.
Figure 6B:
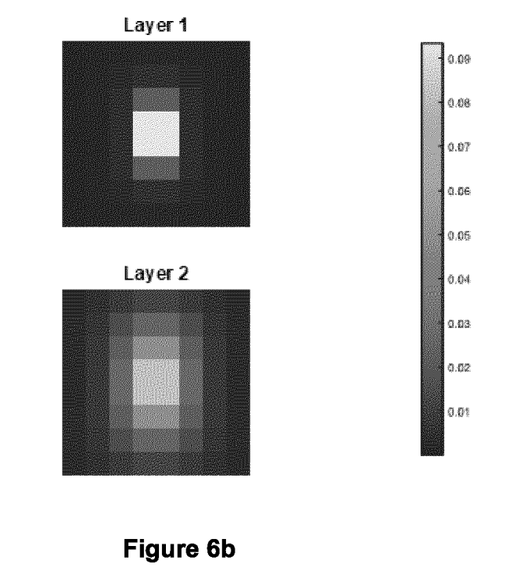
FIG. 6b is a power distribution chart for the two-layer transmissive MS of FIG. 2.

The benefits of the two-layer transmissive RIS relative to a single-layer RIS architecture can also be understood on review of the power distribution of each architecture. FIG. 6a includes a power distribution chart of a single-layer transmissive RIS and FIG. 6b includes a first power distribution chart of a first layer of the two-layer transmissive RIS and a second power distribution chart of a second layer of the two-layer transmissive RIS. It can be seen by comparison of FIGS. 6a and 6b that the element utilization of the RIS is comparatively low for the single-layer transmissive RIS compared to the two-layer transmissive RIS. In other words, only a small proportion of the elements of the single-layer transmissive RIS are utilized compared to the proportion of elements of both layers of the two-layer transmissive RIS. It can also be seen from FIG. 6b that the power distribution on the second layer of the two-layer transmissive RIS is relatively smooth compared to the first layer.

In the above embodiments, the processor communicates with the UE and each layer of the multi-layer RIS by a wired connection. However, this is non-essential and the processor may communicate with the UE and each layer of the multi-layer RIS via a wireless connection. It is also non-essential that the operations of the method of the present disclosure are carried out by a single processor. That is, the processing may be performed by the UE, by the base station, by an external node, or in a distributed manner, with suitable wired or wireless communication links between the various elements.

The skilled person will also understand that the present disclosure may be applied to a downlink communication (that is, from the base station to the UE) where the UE receives the downlink communication through each layer of the multi-layer RIS. Furthermore, the present disclosure is not limited to a cellular telecommunications example, such that it may be applied to a wireless signal between a transmitter and a receiver in other forms of wireless telecommunications network, such as between a transmitter and receiver of a wireless local area network or a wireless wide area network. Nonetheless, the present disclosure has particular benefits when applied to a wireless signal being transmitted from a low-powered and/or low-cost device, such as a UE, where conventional beamforming techniques are prohibitively costly and/or resource intensive. Furthermore, the skilled person will understand that this disclosure may be applied to transmissions from a single transmitter to multiple receivers.

In the above embodiments, the UE had two antennas in a ULA and the base station had six antennas in a ULA. The skilled person will understand that this is non-essential and different antenna configurations are possible. That is, the channel matrices between the UE and first transmissive RIS layer of the multi-layer RIS is sufficiently static such that the channel matrix may be measured and recorded at installation and thereafter used in the algorithm. Furthermore, the channel matrix between the last transmissive RIS layer and the base station is sufficiently far field that it is not affected by a change in antenna configuration and, in any event, are measured by a channel estimation process.

The skilled person will also understand that the present disclosure is not limited to optimizing SNR performance, and other wireless communications performance metrics may be used, such as latency or throughput.

In the above embodiment, each layer of the multi-layer transmissive RIS had the same number of elements. The skilled person will understand that the present disclosure is not limited in this way and can be applied to multi-layer RISs where one or more layers have a differing number of elements. This would merely result in a change in the dimensions of the matrices and potentially a change in the form of the device housing (e.g. from a cuboidal shape to a flared structure).

The skilled person will understand that any combination of features is possible within the scope of the disclosure, as claimed.

The invention claimed is:

1. A method of controlling a transmission of a wireless signal in a wireless telecommunications network, the wireless telecommunications network including a transmitter, a multi-layer transmissive Reconfigurable Intelligent Surface (RIS) including a first transmissive RIS layer and a last transmissive RIS layer, and a receiver, the method comprising:

determining a beamforming vector to be applied by the transmitter, a first phase shift matrix to be applied by the first transmissive RIS layer, a last phase shift matrix to be applied by the last transmissive RIS layer, and a combining vector to be applied by the receiver; and in a transmission of a wireless signal from the transmitter to the receiver, the wireless signal passing through the first transmissive RIS layer and the last transmissive RIS layer:
causing the transmitter to use the determined beamforming vector,
causing the first transmissive RIS layer to use the determined first phase shift matrix,
causing the last transmissive RIS layer to use the determined last phase shift matrix, and
causing the receiver to use the determined combining vector.

2. The method as claimed in claim 1, wherein the beamforming vector, the first phase shift matrix, the second phase shift matrix and the combining vector are determined as a solution to a wireless communications performance optimization problem.

3. The method as claimed in claim 2, wherein the wireless communications performance optimization problem is solved in a series of iterations until a convergence criterion is met.

4. The method as claimed in claim 3, wherein the convergence criterion is based on a current wireless communication performance for a current iteration of the series of iterations, and the current wireless communications performance is determined based on:
a beamforming vector for the current iteration of the series of iterations, based on the first phase shift matrix of a previous iteration of the series of iterations, the last phase shift matrix of the previous iteration of the series of iterations, and the combining vector of the previous iteration of the series of iterations;
a first phase shift matrix of the current iteration of the series of iterations, based on the beamforming vector of the previous iteration of the series of iterations, the last phase shift matrix of the previous iteration of the series of iterations and the combining vector of the previous iteration of the series of iterations;
a last phase shift matrix of the current iteration of the series of iterations, based on the beamforming vector of the previous iteration of the series of iterations, the first phase shift matrix of the previous iteration of the series of iterations, and the combining vector of the previous iteration of the series of iterations; and
a combining vector of the current iteration of the series of iterations, based on the beamforming vector of the previous iteration of the series of iterations, the first phase shift matrix of the previous iteration of the series of iterations and the last phase shift matrix of the previous iteration of the series of iterations.

5. The method as claimed in claim 4, wherein the combining vector for the current iteration of the series of iterations is determined as:

$$v = \psi_{max}\left(g^H\left(\prod_{r=R}^{1}\Theta_r f_r\right)ww^H\left(\prod_{r=R}^{1}\Theta_r f_r\right)^H g\right)$$

where:
r is an element of a set of 1 to R, where R is a count of transmissive RIS layers of the multi-layer transmissive RIS,
$\psi_{max}$ is a matrix operator for calculating an eigenvector corresponding to a largest eigenvalue of $$\left(g^H\left(\prod_{r=R}^{1}\Theta_r f_r\right)ww^H\left(\prod_{r=R}^{1}\Theta_r f_r\right)^H g\right),$$

g is a frequency-domain channel matrix from the last transmissive RIS layer to the receiver, $\Theta_r$ is a phase shift matrix of an r-th transmissive RIS layer of the previous iteration of the series of iterations, including the first phase shift matrix of the first transmissive RIS layer of the previous iteration of the series of iterations when r equals 1 and the last phase shift matrix of the last transmissive RIS layer of the previous iteration of the series of iterations when r equals R, $f_r$ is a frequency-domain channel matrix from the transmitter to the first transmissive RIS layer when r equals 1 and is a frequency-domain channel matrix from an (r-1)-th transmissive RIS layer to an r-th transmissive RIS layer when r is greater than 1, and w is the beamforming vector of the previous iteration of the series of iterations.

6. The method as claimed in claim 4, wherein the first phase shift matrix of the first transmissive RIS layer of the current iteration of the series of iterations is determined as:

$$\theta_1 = \exp\left(j\arg\left(\text{diag}\,(f_1 w)^H \left(\prod_{r=R}^{2} \Theta_r f_r\right)^H gv\right)\right)$$

where:
r is an element of a set of 1 to R, where R is a count of transmissive RIS layers of the multi-layer transmissive RIS, $f_1$ is a frequency-domain channel matrix from the transmitter to the first transmissive RIS layer, w is the beamforming vector of the previous iteration of the series of iterations, $\Theta_r$ is a phase shift matrix of an r-th transmissive RIS layer of the previous iteration of the series of iterations, including the last phase shift matrix of the last transmissive RIS layer of the previous iteration of the series of iterations when r equals R, $f_r$ is a frequency-domain channel matrix from the (r-1)-th transmissive RIS layer to the r-th transmissive RIS layer, g is a frequency-domain channel matrix from the last transmissive RIS layer to the receiver, and v is the combining vector for the previous iteration of the series of iterations.

7. The method as claimed in claim 4, wherein the last phase shift matrix of the last transmissive RIS layer of the current iteration of the series of iterations is determined as:

$$\theta_R = \exp\left(j\arg\left(\text{diag}\left(f_R\left(\prod_{r=R-1}^{1} \Theta_r f_r\right) w\right)^H gv\right)\right)$$

Where:
r is an element of a set of 1 to R, where R is a count of transmissive RIS layers of the multi-layer transmissive RIS, $\Theta_r$ is a phase shift matrix of an r-th transmissive RIS layer of the previous iteration of the series of iterations, including the first phase shift matrix of the first transmissive RIS layer of the previous iteration of the series of iterations when r equals 1, $f_r$ is a frequency-domain channel matrix from the transmitter to the first transmissive RIS layer when r equals 1 and is a frequency-domain channel matrix from an (r-1)-th transmissive RIS layer to an r-th transmissive RIS layer when r is greater than 1, w is the beamforming vector of the previous iteration of the series of iterations, g is a frequency-domain channel matrix from the last transmissive RIS layer to the receiver, and v is the combining vector for the previous iteration of the series of iterations.

8. The method as claimed in claim 4, wherein the beamforming vector of the current iteration of the series of iterations is determined as:

$$w = \sqrt{P_{max}}\,\frac{\left(\prod_{r=R}^{1} \Theta_r f_r\right)^H gv}{\|\left(\prod_{r=R}^{1} \Theta_r f_r\right)^H gv\|_2}$$

where:
r is an element of a set of 1 to R, where R is a count of transmissive RIS layers of the multi-layer transmissive RIS, $\Theta_r$ is a phase shift matrix of an r-th transmissive RIS layer of the previous iteration of the series of iterations, including the first phase shift matrix of the first transmissive RIS layer of the previous iteration of the series of iterations when r equals 1 and the last phase shift matrix of the last transmissive RIS layer of the previous iteration of the series of iterations when r equals R, $f_r$ is a frequency-domain channel matrix from the transmitter to the first transmissive RIS layer when r equals 1 and is a frequency-domain channel matrix from an (r-1)-th transmissive RIS layer to an r-th transmissive RIS layer when r is greater than 1, g is a frequency-domain channel matrix from the last transmissive RIS layer to the receiver, and v is the combining vector for the previous iteration of the series of iterations.

9. The method as claimed in claim 4, wherein the multi-layer transmissive RIS includes one or more intermediate transmissive RIS layers and the transmission of the wireless signal from the transmitter to the receiver passes through the first transmissive RIS layer, each intermediate transmissive RIS layer and the last transmissive RIS layer, and the method further comprises:

determining an intermediate phase shift matrix for each of the one or more intermediate transmissive RIS layers to be applied by each respective intermediate transmissive RIS layer; and causing the first intermediate transmissive RIS layer to use the determined first intermediate phase shift matrix in the transmission of the wireless signal from the transmitter to the receiver, wherein the current wireless communications performance is determined based on:

the beamforming vector for the current iteration of the series of iterations, that is further based on each intermediate phase shift matrix of the previous iteration of the series of iterations, the first phase shift matrix of the current iteration of the series of iterations, that is further based on each intermediate phase shift matrix of the previous iteration of the series of iterations, each intermediate phase shift matrix for the current iteration of the series of iterations, each intermediate phase shift matrix being based on the beamforming vector of the previous iteration of the series of iterations, the first phase shift matrix of the previous iteration of the series of iterations, the last phase shift matrix of the previous iteration of the series of iterations and the combining vector of the previous iteration of the series of iterations, the last phase shift matrix of the current iteration of the series of iterations, that is further based on each intermediate phase shift matrix of the previous iteration of the series of iterations, and the combining vector of the current iteration of the series of iterations, that is further based on each intermediate phase shift matrix of the previous iteration of the series of iterations.

10. The method as claimed in claim 9, wherein each intermediate phase shift matrix for the current iteration of the series of iterations is determined as:

$$\theta_l = \exp\left(j\arg\left(\text{diag}\left(f_l\left(\prod_{r=l-1}^{1}\Theta_r f_r\right)W\right)^H\left(\prod_{r=R}^{l+1}\Theta_r f_r\right)^H gv\right)\right)$$

where:
r is an element of a set of 1 to R, where R is a count of transmissive RIS layers in the multi-layer transmissive RIS, l is an element of a set of 2 to R-1, $f_l$ is a frequency-domain channel matrix from the (l-1)-th transmissive RIS layer to the l-th transmissive RIS layer, $\Theta_r$ is a phase shift matrix of an r-th transmissive RIS layer of the previous iteration of the series of iterations, including the first phase shift matrix of the first transmissive RIS layer of the previous iteration of the series of iterations when r equals 1 and the last phase shift matrix of the last transmissive RIS layer of the previous iteration of the series of iterations when r equals R, $f_r$ is a frequency-domain channel matrix from the transmitter to the first transmissive RIS layer when r equals 1 and is a frequency-domain channel matrix from an (r-1)-th transmissive RIS layer to an r-th transmissive RIS layer when r is greater than 1, w is the beamforming vector of the previous iteration of the series of iterations, g is a frequency-domain channel matrix from the last transmissive RIS layer to the receiver, and v is the combining vector for the previous iteration of the series of iterations.

11. The method as claimed in claim 2, wherein the wireless communications performance problem is a Signal to Noise Ratio (SNR) optimization problem.

12. A non-transitory computer readable comprising a computer program comprising instructions which, when the program is executed by a computer, cause the computer to carry out the method of claim 1.

13. A non-transitory computer readable medium comprising the computer program of claim 12.

14. A device for controlling a transmission of a wireless signal in a wireless telecommunications network, the wireless telecommunications network including a receiver configured to apply a combining vector to the wireless signal, the device comprising:
a transmitter; and
a multi-layer transmissive Reconfigurable Intelligent Surface (RIS) including a first transmissive RIS layer and a last transmissive RIS layer, wherein the transmitter is configured to transmit the wireless signal to the receiver, the wireless signal passing through the first transmissive RIS layer and the last transmissive RIS layer, the transmitter is configured to apply a beamforming vector to the wireless signal, the first transmissive RIS layer is configured to apply a first phase shift matrix to the wireless signal, and the last transmissive RIS layer is configured to apply a last phase shift matrix to the wireless signal.

15. The device as claimed in claim 14, wherein the transmitter and the multi-layer transmissive RIS are enclosed in a housing having electromagnetic shielding.

16. The device as claimed in claim 14, further comprising one or more processing modules configured to:
determine the beamforming vector to be applied by the transmitter, the first phase shift matrix to be applied by the first transmissive RIS layer, the last phase shift matrix to be applied by the last transmissive RIS layer, and the combining vector to be applied by the receiver; and in the transmission of the wireless signal from the transmitter to the receiver, the wireless signal passing through the first transmissive RIS layer and the last transmissive RIS layer:
cause the transmitter to use the determined beamforming vector,
cause the first transmissive RIS layer to use the determined first phase shift matrix,
cause the last transmissive RIS layer to use the determined last phase shift matrix, and
cause the receiver to use the determined combining vector.

17. A system in a wireless telecommunications network comprising the device as claimed in claim 14, further comprising the receiver.

18. The system as claimed in claim 17, further comprising one or more processing modules configured to:
determine the beamforming vector to be applied by the transmitter, the first phase shift matrix to be applied by the first transmissive RIS layer, the last phase shift matrix to be applied by the last transmissive RIS layer, and the combining vector to be applied by the receiver; and in the transmission of the wireless signal from the transmitter to the receiver, the wireless signal passing through the first transmissive RIS layer and the last transmissive RIS layer:
cause the transmitter to use the determined beamforming vector,
cause the first transmissive RIS layer to use the determined first phase shift matrix,
cause the last transmissive RIS layer to use the determined last phase shift matrix, and
cause the receiver to use the determined combining vector.

19. The system as claimed in claim 18, wherein the one or more processing modules are disposed on one or more of the device, the receiver, or an external node.

* * * * *